US012650846B2

(12) United States Patent
Gago Alonso et al.

(10) Patent No.: US 12,650,846 B2
(45) Date of Patent: Jun. 9, 2026

(54) BTB PREFETCHING VIA BACK-ANNOTATION

(71) Applicant: Microsoft Technology Licensing, LLC, Redmond, WA (US)

(72) Inventors: Julio Gago Alonso, Barcelona (ES); Santiago Galan, Molins de Rei (ES); Antonio Juan Hormigo, Barcelona (ES); Ivan Pizarro, Hospitalet de Llobregat (ES)

(73) Assignee: Microsoft Technology Licensing, LLC, Redmond, WA (US)

( * ) Notice: Subject to any disclaimer, the term of this patent is extended or adjusted under 35 U.S.C. 154(b) by 209 days.

(21) Appl. No.: 18/374,363

(22) Filed: Sep. 28, 2023

(65) Prior Publication Data
US 2025/0110744 A1     Apr. 3, 2025

(51) Int. Cl.
*G06F 9/38*          (2018.01)
(52) U.S. Cl.
CPC .......... *G06F 9/3806* (2013.01); *G06F 9/3861* (2013.01)
(58) Field of Classification Search
CPC ..................................................... G06F 9/3806
See application file for complete search history.

(56) References Cited

U.S. PATENT DOCUMENTS 11,379,377 B2     7/2022  Ishii
2019/0303160 A1 *  10/2019  Greenhalgh .......... G06F 9/3806

| | | | |
|---|---|---|---|
| 2020/0012497 A1 * | 1/2020 | Clouqueur | G06F 9/3806 |
| 2020/0159537 A1 * | 5/2020 | Bonanno | G06F 9/3844 |
| 2020/0257534 A1 * | 8/2020 | Bonanno | G06F 9/3806 |
| 2021/0089314 A1 * | 3/2021 | Liu | G06F 12/0864 |
| 2022/0100520 A1 * | 3/2022 | Pokam | G06F 9/383 |
| 2023/0053733 A1 * | 2/2023 | Collura | G06F 9/3806 |
| 2024/0192957 A1 * | 6/2024 | Arunachalam | G06F 9/3844 |

FOREIGN PATENT DOCUMENTS

| WO | 2021108007 A1 | 6/2021 |
|---|---|---|
| WO | 2023021018 A1 | 2/2023 |

OTHER PUBLICATIONS

International Search Report and Written Opinion received for PCT Application No. PCT/US2024/046289, Dec. 19, 2024, 14 pages.
International Preliminary Report on Patentability (Chapter I) Received for PCT Application No. PCT/US2024/046289, mailed on Apr. 9, 2026, 09 Pages.

* cited by examiner

*Primary Examiner* — Michael J Metzger
(74) *Attorney, Agent, or Firm* — Schwegman Lundberg & Woessner, P.A.

(57) ABSTRACT

A branch prediction system is configured to perform a method that includes identifying processor branch instructions and building branch target buffer (BTB) branch prediction entries corresponding to the branch instructions. The BTB branch prediction entries are stored in a hierarchy of BTBs. Target branch instruction are identified that have a target BTB entry following execution of a first branch instruction having a first BTB branch prediction entry. A target BTB entry reference is added to the first BTB branch prediction entry.

20 Claims, 6 Drawing Sheets

*500*

510

IDENTIFY BRANCH
INSTRUCTIONS

520

BUILD BTB ENTRIES

530

STORE BTB ENTRIES
IN BTB ARRAY

540

IDENTIFY TARGET
BTB ENTRY

550

ADD REFERENCE TO
FIRST BTB ENTRY

560

PRE-FETCH BTB
ENTRIES

BTB PREFETCHING VIA BACK-ANNOTATION

BACKGROUND

In computing, processor pipeline designs benefit from trying to predict which next instruction will likely be executed following execution of a current instruction. Execution of the current instruction may result in a branch to one of two or more next instructions. Instruction branch speculation is used to determine the most likely next instruction, referred to as a target instruction.

Pipeline designs split computing operations into stages. Each stage is typically performed by dedicated hardware. An example computing pipeline includes stages (i) fetching an instruction, (ii) reading the instruction, (iii) decoding the instruction, (iv) executing the decoded instruction, (v) accessing memory to read operands from memory, and (vi) writing the results to the memory. Each of the stages relies on output of the prior stage to perform its operation. Instead of waiting for a first instruction to go through the entire pipeline, a next instruction begins to go through the pipeline before the first instruction is through the pipeline.

Traditionally, branch speculation is achieved by predicting the target of branches. Such targets can be fixed, for unconditional direct branches, variable, for indirect branches, dual (taken, non-taken), for conditional branches, or a combination of fixed, dual, or variable, when the instruction set architecture supports them.

To perform such prediction, different algorithms exist, which use dedicated storage (typically named Branch Target Buffers (BTBs)) to remember key details about branch location, type, and potential targets. Traditionally, performance is achieved by increasing the accuracy of such prediction. However, in certain workloads, capacity is also important, which is the ability to track and anticipate a large working set of branches, not necessarily difficult to predict with accuracy. The storage to track branches is typically made of several levels, with each level comprising several entries that outnumber, but are also slower than, the previous level. Increasing the storage capacity of branch prediction structures usually impacts the latency required to resolve such branches, which has an impact on performance.

SUMMARY

A branch prediction system is configured to perform a method that includes identifying processor branch instructions and building branch target buffer (BTB) branch prediction entries corresponding to the branch instructions. The BTB branch prediction entries are stored in a hierarchy of BTBs. Target branch instruction are identified that have a target BTB entry following execution of a first branch instruction having a first BTB branch prediction entry. A target BTB entry reference is added to the first BTB branch prediction entry.

DETAILED DESCRIPTION

Figure 1:
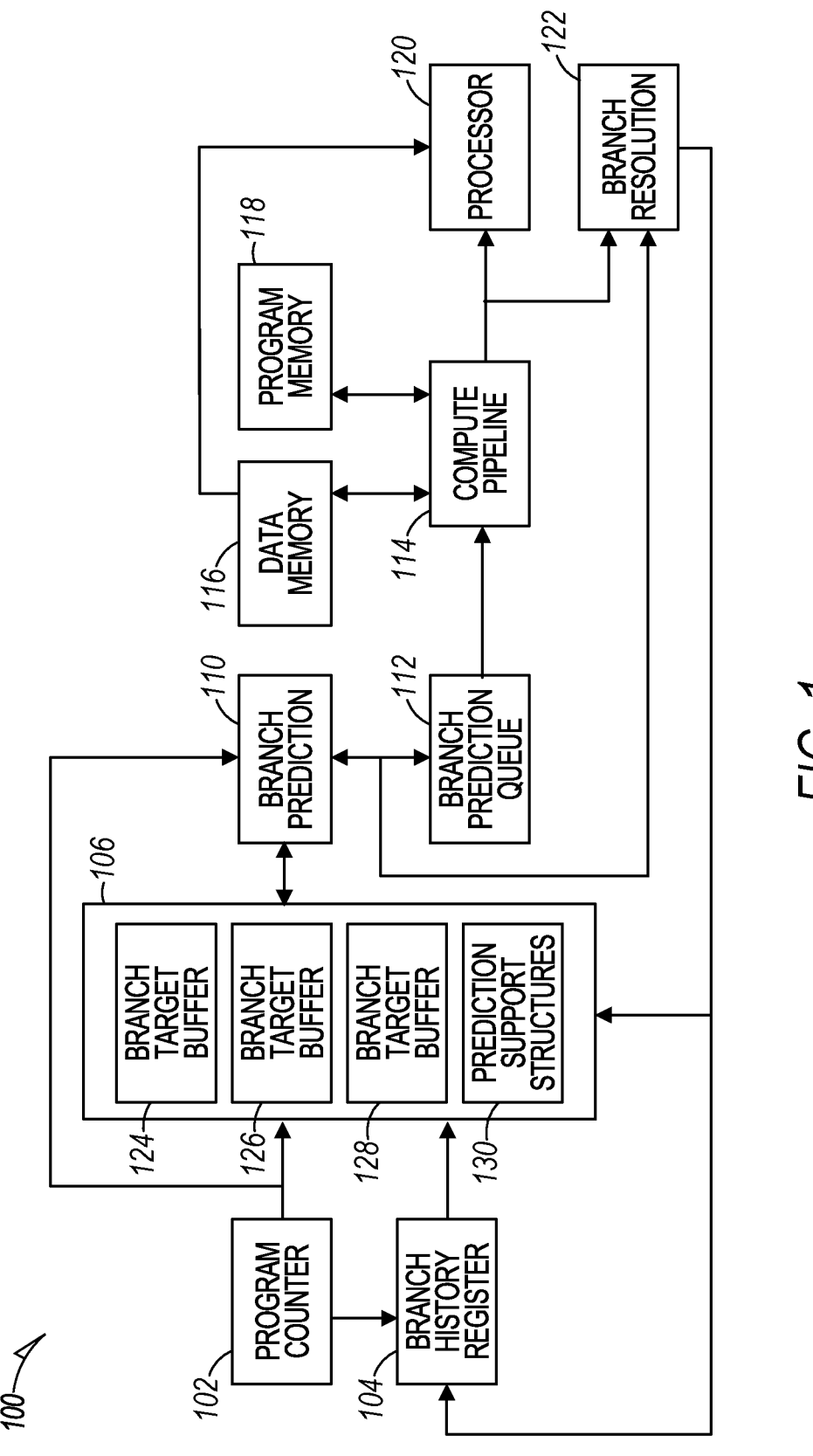
FIG. 1 is a block diagram of a system 100 for branch target prediction according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

An improved system implements an algorithm that anticipates branch prediction entries required for future branch predictions and ensures such entries are brought to smaller and faster cache storage levels, such as branch target butters (BTBs) that are dedicated to storing branch prediction entries. Patterns or sequences of branch prediction entries are detected during execution of instructions, enabling more efficient prefetching of branch prediction entries. Reducing the latency of access to such branch prediction entries even by a few cycles can result in a substantial increase in performance.

The improved system can detect different patterns or chains of branch prediction entries for different types of branches. For unconditional branches, the pattern is trivial, and a particular entry is always followed by another one, and the relationship stays immutable. For conditional branches, the pattern is dual, and two entries may follow a current entry, depending on the branch being taken or not. Since conditional branches may be highly biased, the system detects a conditional branch and can decide to follow only one of the two paths when, for instance, correlation indicates a path with high confidence. In the case of loops, a loop predictor is leveraged to anticipate when the entries for the exit condition of the loop should be prefetched. For indirect branches, multiple entries may follow the current entry. Additionally, the system leverages existing correlation mechanisms to anticipate which entry follows an indirect branch and prefetches the entry with highest priority. Procedure calls are handled like direct or indirect unconditional branches, depending on the call type. Returns are always handled like indirect branches.

The entries may be referred to as data structure entries or BTB entries. The entries to be prefetched are annotated and backpropagated. Lists of future entries are dynamically constructed and maintained for each entry. The annotation and back propagation happen dynamically during normal execution of instructions. Initially, the system includes direct followers of one entry, which is later grown by concatenation: when entry "B" is found to follow entry "A", the followers of "B" are concatenated to the list of followers of "A".

The system may adapt to a current workload and phase by increasing or decreasing a prefetch distance (i.e.: how further away in the future are the entries that are prefetched) as well as the number of entries that are prefetched in each operation, while also tracking the effectiveness of current speculation depth and increasing or reducing the amount of prefetching being executed. Such adaptation is beneficial because it can limit the amount of prefetching when it is not effective. Not limiting the amount of prefetching can increase the energy used by a computer without obtaining additional performance or even decreasing performance by adding activity to internal structures which interferes with non-prefetching activities.

A reset mechanism may be used to make sure the system quickly adapts to context switches such as occur in on demand virtual machine environments, and to jitting.

An overview of a system with BTB branch prediction is described to provide a general basis of understanding for BTB and operations of some BTB systems. Then more details of patterns or sequences of BTB entries are provided.

FIG. 1 is a block diagram of a system 100 for branch target prediction. The system 100, as illustrated, comprises components including a program counter 102, a branch history register 104, branch prediction structures 106, branch prediction circuitry 110, a branch prediction queue 112, a compute pipeline 114, data memory 116, program memory 118, a processor 120, and branch resolution circuitry 122.

The program counter 102 identifies an instruction in program memory 118 that is to be executed, such as by an address. The program counter 102 typically increments an instruction counter after providing a value of the instruction counter to prediction structures 106 and branch prediction circuitry 110. The program counter 102 thus typically defaults to a linear, increasing program count. Branch instructions are instructions that may provide a non-linearity to the sequence of instructions executed. Thus, the default operation of the program counter 102, in light of a branch instruction for which a branch is taken, needs to be overridden.

The branch history register (BHR) 104 includes data for a specified number of most recent conditional branches executed. The data for a given conditional branch can be a single bit. The bit can be set to "0" if the branch was not taken and "1" if the branch was taken. With each new conditional branch that is encountered in executing the application, the entries of the BHR 104 are shifted to the left and then the outcome of the new branch, as predicted by the branch prediction circuitry 110, is written into the rightmost position of the BHR 104. During the shifting, the bit in the leftmost position of the BHR 104 will be lost. For instance, with a 5-bit BHR and after 5 conditional branches since the start of the processor execution, the BHR 104 may contain the example sequence "10101", indicating that the last conditional branch seen in the program sequence was taken, the previous one was not taken, and so on. If a new conditional branch is seen and determined to be taken, the new BHR 104 contents would be 01011, resulting from the shift to the left of the previous value, losing the leftmost bit and adding a new bit on the right. The size of the BHR 104 is implementation dependent.

The branch prediction structures 106 include branch target buffers (BTBs) 124, 126, 128 that are typically indexed by a subset of the program counter values. For example, a number of least significant bits (LSBs) can be used to index into the BTBs 124, 126, 128. In another example, a same number of contiguous bits that are not the LSBs can be used to index into the BTBs 124, 126, 128. The BTBs 124, 126, 128 include entries that include branch destinations for branches that have historically corresponded to a branch. Thus, each BTB 124, 126, 128 includes a program counter value that has historically been executed immediately after the branch instruction that indexes into the entry.

There are multiple BTBs 124, 126, 128 illustrated in FIG. 1, however, a system may include only a single BTB 124, 126, 128. In systems that include multiple BTBs 124, 126, 128, one of the BTBs is typically stored physically in a memory that is relatively small and close to the prediction circuitry 110, another of the BTBs is stored a little further away or in a memory that is slower to access and has a larger capacity, and yet another of the BTBs is stored even further away or in a memory that is even slower to access and has an even larger capacity. The BTB closest to the prediction circuitry 110 is similar to an L1 cache for a processor in that it provides the fastest access times and has a smallest capacity among the BTBs. The other BTBs are usually located on a same chip, as the BTBs may be accessed in parallel and having different latencies.

The prediction support structures 130 can include a direction buffer. The direction buffer can indicate whether the branch jumps to a program counter value less than the present program counter value or greater than the present program counter value. The prediction support structures 130 can include data indicating a history of one or more program counter values that lead to the branch or were realized after the branch.

Other prediction structures 130 can include a set of arrays accessed with different subsets of PC index and BHR 104. Entries in the other prediction structures 130 can be tagged and provide dynamic taken/not-taken predictions for conditional branches that change dynamically (a conditional branch predictor like a tagged geometric length predictor (TAGE)). The other prediction structures 130 can include dedicated structures that help find out which of the different targets of an indirect predictor is to be followed by a current PC and BHR 104 (indirect predictor, like an indirect target tagged geometric length predictor (ITTAGE)), a loop predictor, a return predictor, and so on.

Instead of waiting for the compute pipeline 114 to indicate a non-linearity to the program counter 102, prediction structures 106 and the branch prediction circuitry 110 can preemptively predict the non-linearity in the program counter 102. The branch prediction circuitry 110 can identify that a branch is likely to be taken and the program counter value associated with the branch. The branch prediction circuitry 110 can provide the program counter value to the program counter 102.

The branch prediction circuitry 110 receives the program counter value, contents of the entry of the BTB 124, 126, 128, prediction support structures 130, and branch history register 104, which contains one bit for each previously observed conditional branch up to a limit, and indicator data from the branch prediction queue 112 that indicates whether the branch prediction queue 112 is full or not. The branch prediction circuitry 110 determines a likely next program counter value based on the received data. The branch prediction circuitry 110 can receive the totality of the BHR 104, such as to help determine the final outcome of the branch. The branch prediction circuitry 110 can use information from the BTBs 124, 126, 128, the BHR 104 and all other prediction structures 130 to make a prediction of the final outcome of the branch.

There are many types of branch prediction that can be implemented by the branch prediction circuitry 110.

Example types of branch prediction include static techniques, dynamic techniques, history-based prediction, or a combination thereof. Example static techniques include using a heuristic like "assume branches are never taken" or "assume branches are always taken" and providing the program counter value accordingly.

In the case of dynamic branch prediction, the branch prediction circuitry 110 monitors the actual branch behavior by recording the recent history of each branch. Dynamic branch prediction assumes that the future behavior will continue the same way and make predictions. Examples of dynamic branch prediction techniques include using a 1-bit branch-prediction buffer, 2-bit branch-prediction buffer, a correlating branch prediction buffer, a tournament branch predictor, using an output from a BTB without further processing, a return address predictor, an integrated instruction fetch unit, or a combination thereof. These predictors are known, but a short summary of each is provided, not including BTB because that has been explained already.

A 1-bit branch predictor stores 1-bit values to indicate whether the branch is predicted to be taken/not taken. The table can be indexed in the same manner as the BTB 124, 126, 128.

A 2-bit predictor changes prediction only on two successive mispredictions. Two bits are maintained in the prediction buffer and there are four different states. Two states corresponding to a taken state and two corresponding to not taken state. The 2-bit predictor schemes use only the recent behavior of a single branch to predict the future behavior of that branch.

In a correlating branch predictor behavior of one branch is dependent on the behavior of other branches. There is a correlation between different branches. Branch predictors that use the behavior of other branches to make a prediction are called correlating or two-level predictors. These predictors typically make use of global information rather than local behavior information. The information about any number of earlier branches can be maintained in the BHR 104. For example, the branch prediction circuitry 110 can maintain the information about three earlier branches so that the behavior of the current branch now depends on how these three earlier branches behaved.

A tournament predictor predicts the predictor and attempts to select the right predictor for the right branch. There are two or more different predictors maintained, typically one based on global information and one based on local information, and the choice of the predictor is based on a selection strategy. For example, the local predictor can be used and then every time it commits a mistake, the prediction can be changed to the global predictor. Alternatively, the switch between predictors can be made only when there are two or more successive mispredictions.

Note that in some BTB schemes, there is no 1-cycle penalty for a faster BTB 124 in calculating the program counter value for a taken branch. A BTB scheme that uses the program counter value from the BTB 124 does not incur this penalty. The BTBs 126, 128 might need more time to provide a result and thus may still incur a penalty of one or more cycles. Return address predictors predict returns, that is, jumps whose destination address varies at run time. Indirect branches are a type of branch whose target may change when the same branch instruction is seen. Indirect branches can be divided in two classes: returns, and the rest. Both, returns and the rest, may have cases in which their target never changes, and in that situation, both are trivial to predict, and can be predicted by the BTB 124, 126, 128 without the intervention of additional prediction architecture. The situation in which indirect branches are hard to predict is when the target of the indirect branch changes target. Returns are predicted by a return stack buffer included in other portions of the prediction support structures 130 and the rest of the hard indirect branches are predicted by an indirect predictor in other portions of the prediction structures 130. Though procedure returns can be predicted with a BTB, the accuracy of such a prediction technique can be low if the procedure is called from multiple sites and the calls from one site are not clustered in time. To overcome this problem, return address predictors use a small buffer of return addresses operating as a stack in the return stack buffer 334. The return stack buffer 334 (see FIG. 3) caches the most recent return addresses: pushing a return address on the stack at a call and popping one off at a return. If the cache is as large as a maximum call depth it will predict the returns perfectly.

An integrated instruction fetch unit can be used to meet the demands of modern processors that issue multiple instructions every clock cycle. The integrated instruction fetch unit can be configured as a separate autonomous unit that feeds instructions to the rest of the pipeline.

The program counter value from the branch prediction circuitry 110 is entered into the branch prediction queue 112 when the branch prediction queue 112 has sufficient space. The branch prediction queue 112 stores, in a first-in first-out (FIFO) manner, the branches predicted by the branch prediction circuitry 110. The branch prediction queue 112 provides the oldest program counter value it is storing to the compute pipeline 114.

The compute pipeline 114 is a series of stages that operate to provide the processor 120 with an instruction to execute and store results of the execution in the data memory 116. The compute pipeline 114 determines which instruction to fetch from the program memory 118 and provides the instruction, and corresponding data, to the processor 120. The processor 120 executes the instruction and the data memory 116 with the results.

The branch resolution circuitry 122 determines if the branch prediction circuitry 110 generated the same program counter value as the program counter value associated with the instruction that was executed by the processor 120 in executing the branch. The branch resolution circuitry 122 updates the branch history register 104 and the relevant prediction structures 106 if there is a mismatch between the program counter values. Also, if the prediction from the branch prediction circuitry 110 is not correct, the pipeline 114 can stall while re-fetching. There are processors 120 that are smart enough to prevent stalling while re-fetching, allowing instructions that are known correct because they were older than the mispredicted branch (in program order) to be executed while at the same time aborting the execution of instructions that were incorrectly fetched after the branch.

Each of the components of the system 100 is implemented using electric or electronic circuitry. The electric or electronic circuitry can include resistors, transistors, capacitors, inductors, diodes, amplifiers, logic gates (AND, OR, XOR, negate, buffer, or the like), multiplexers, switches, memory devices (e.g., random access memory (RAM) or read only memory (ROM)), processing units (e.g., a central processing unit (CPU), graphics processing unit (GPU), field programmable gate arrays (FPGAs), application specific integrated circuit (ASIC), or the like), power supplies, or the like.

For the branch prediction to be correct, the system 100 needs to correctly guess: whether the program counter value corresponds to a branch, whether the branch is to be taken, and if the branch is to be taken, what is the target program counter.

An optional BTB victim cache may be used to receive BTB entries that are evicted from other BTBs in the system. An evicted entry is one that removed from the BTB because it was not correct, or more commonly because the space it occupies is to be used by another BTB entry that is now in use (a BTB entry that is used more recently than the one being evicted). A BTB entry that is evicted because it has not been recently used and is replaced by another one, may be used again in the future, and thus can be stored for future use.

That the entry was not used for this execution cycle, does not mean that the entry will not be used for a future execution cycle. The location and size of the BTB victim cache can be such that an access to the BTB victim cache is less than the time, energy, or a combination thereof, it takes for an instruction to traverse a compute pipeline, the time it takes for a flush and reset of the compute pipeline, or a combination thereof.

Figure 2:
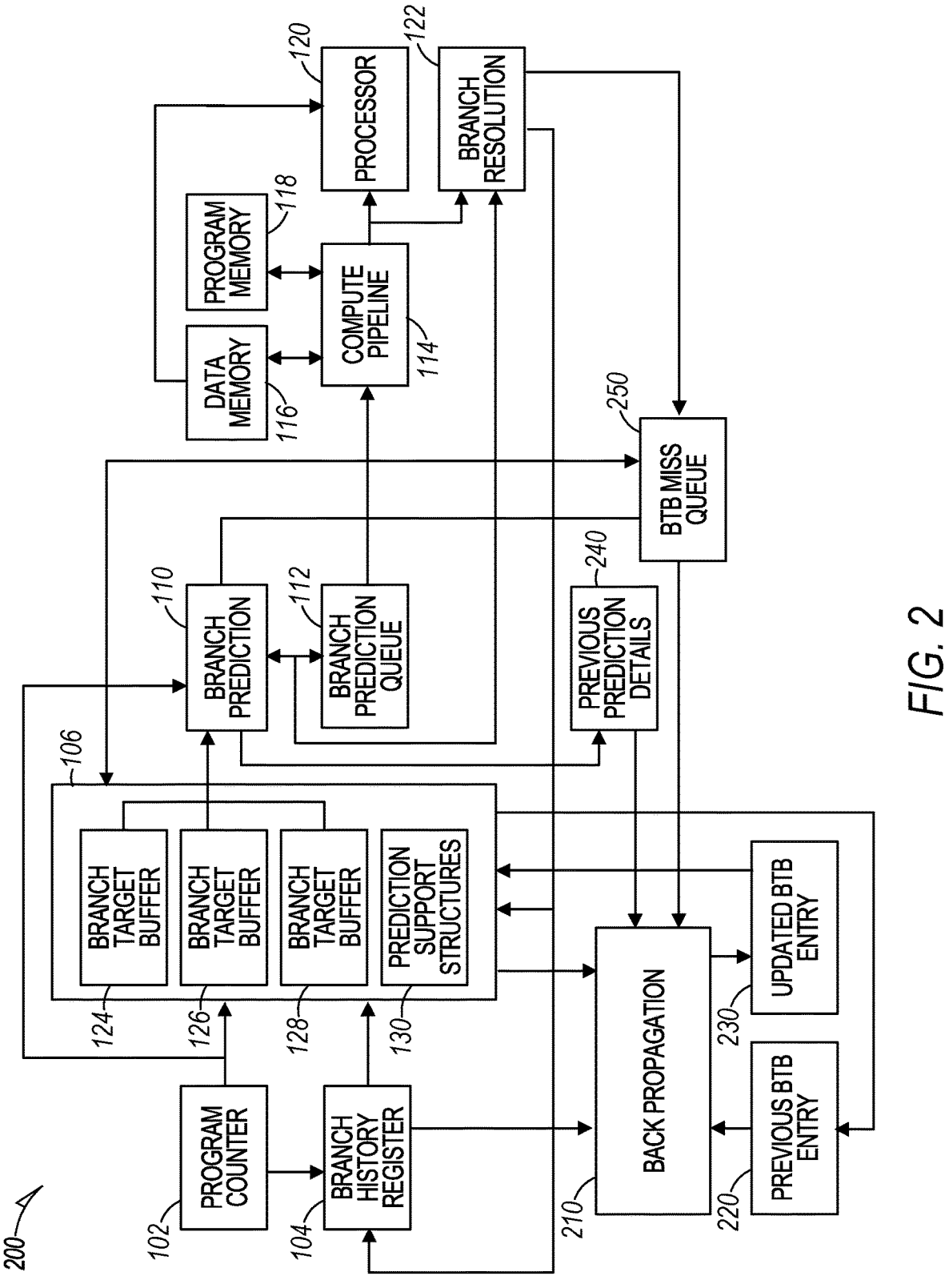
FIG. 2 is a block flow diagram illustrating a system for updating BTB entries with references to branches taken or not taken according to an example embodiment.

FIG. 2 is a block flow diagram illustrating a system 200 for updating BTB entries with references to branches taken or not taken according to an example embodiment. System 200 is a modified version of system 100 and like reference numbers are used for like parts.

In one example, a typical BTB entry in a set-associative BTB includes a TAG (a subset of bits from the program counter (PC)), to fully identify the PC of the branch the entry refers to, and a target PC, to fully identify the target of the branch. The entry may also include information about the branch type (conditional, indirect, loop, and so on), its biasing and other details. For convenience of description, there is only one branch and target per BTB entry.

Execution of instructions following a branch may continue, with the program counter incrementing the program count. A further branch instruction may then be encountered and have or result in a further BTB entry for that branch instruction. A conditional branch will sometimes follow the incremental program count (the branch is said to be "non-taken") and sometimes follow the non-linear target specified in the branch instruction itself (the branch is said to be "taken"). Unconditional branches are always taken, including calls and returns, as well as unconditional indirect branches, which can change their target in every different execution of the same branch, but they always take the non-linear path (they are always taken). It is possible that a branch is taken and yet it follows the linear incremental program count, if the target specified by the branch instruction happens to be exactly the instruction that immediately follows the branch.

The system 200 adds backpropagation data to BTBs. The backpropagation data can include a reference, such as a link, to the further BTB entry in a previous BTB entry. A BTB entry that includes backpropagation data is called an extended BTB entry. Each extended BTB entry is written into at least one of the BTBs 124, 126, 128. The current BTB entry index is used to update the direct connections between previous BTB entries 220 (which may be part of prediction support structures 130) and the current BTB entry in the program counter 102, as directed by the branch prediction circuitry 110, from the immediately previous prediction cycle.

In systems without extended BTB entries, the branch predictor works with one PC, one BHR and one BHR entry at a time. The PC is used to index the BTBs and search for entries that match the TAG part of the PC. If one is found, that becomes the current BTB entry, and its contents are used to remember certain details of the branch that has been found, and are also used together with information from other branch predictor structures to determine what is the PC predicted as next. With extended BTB entries, two BTB entries are used, the previous and a next BTB entries, or previous and current BTB entries, or current and next BTB entries. Two entries that are consecutive in the sequence of PCs predicted by the branch prediction are being managed and may be stored in temporary storage in prediction support structures 130. Back annotation uses information from a current BTB entry to annotate one or more previous BTB entries. Two entries are used because the annotations are based on the set & way of the BTB, that is, their index, so until the next BTB entry is found, the set+way of the next BTB entry is not known. Once known, enough information is available to annotate the previous BTB entry with current BTB entry.

The contents of the current BTB entry are used to update or annotate the indirect connections, via back propagation circuitry 210. The current BTB entry may be obtained from prediction structures 106, using the current BTB entry index from program counter 102.

A list of references to BTB entries from the current BTB entry are concatenated. The BTB entry references, taken, or not taken, are concatenated to the list of references of the previous BTB entry. When the branch predictor has indicated a taken path is being followed, all the references are concatenated to a taken list of references. If the non-taken path is predicted by the branch predictor, all references, taken and non-taken from the current BTB entry will be concatenated to the non-taken list of the previous BTB entry. After the storage of the previous extended BTB entry in the temporary storage has been stored in the BTBs, the temporary storage is overwritten with a current BTB entry to be ready for update during the next prediction cycle. Selected details associated with the current prediction, such as whether a taken/not-taken path is followed, may also be stored as previous prediction details 240 (which may be part of prediction support structures 130) in order for use during back-propagation activity of the next prediction cycle.

In one example, the index for the current BTB entry as well as details from current branch prediction outcome is used to annotate the previous BTB entry, which is stored in the separate storage structure, updated BTB entry 230 which may be part of prediction support structures 130. Such annotation is performed with circuitry that picks the contents of the separate storage structure, mixes it with the new details in order to build the annotated structure, and then sends the "updated BTB entry" back to the BTB arrays, where it originated from, in order to "remember" the new annotations in the future. Such circuitry may be part of back propagation circuitry 210 Sending the updated BTB entry back to the BTB arrays is done to enable replacing that separate storage with the current BTB entry, which will become the previous BTB entry when time advances to the next cycle. Some chips are designed to allow this type of operation, as the separate storage structure will maintain the contents that were stored at the end of the previous cycle during the current cycle, the contents can be used before storing new data again at the end of current cycle for use in the next cycle.

Alternatively, only a subset of the BTBs is extended, for example, the last BTB level. To save storage, links to BTB entries can be minimized, using only BTB indices (way and set). To simplify management of allocations and updates, two separate lists may be kept, respectively, for the taken and not-taken paths.

While extending BTB entries increases the size of the BTBs, extending the BTB entries does not increase the total number of entries. Further, the referenced or new information does not need to be in the critical path, but may be stored in a separate physical array, preventing an increase in the latency to access the BTBs. In one example, the critical path is the sequence of circuits that process data sequentially and that end up producing the data needed for processing instructions by the end of a program cycle. In contrast, non-critical paths are circuits that run in parallel with the critical path, but that are faster or slower and are not needed at the end of the cycle, so you can take more time to compute them. In this context, the critical path is made of the read of the essential BTB information needed to for the branch prediction engine to compute its results, and then non-critical path is the annotations that we have added and that are used to prefetch future BTB entries. So, although one can think about the first level BTB as a single entity, it may be physically composed of several smaller structures. One of such structures can be the original contents of the BTB and be fast and meet the critical path, whereas the annotations can be in another structure, that is slower to read, but that is ok because it does not feed the critical path.

When a new BTB entry is created, such lists of references are empty and can be filled in via backpropagation processing of BTB entries as instructions are executed and branches taken or not taken.

When a direct transition between BTB entries is followed during regular branch prediction the list of references for entry A is initialized to "B". For example, BTB entry A regards a branch X and is found to be followed by BTB entry B. This transition can be both due to a taken or non-taken branch, with separate storage or partitions of storage for each. One storage will be used to maintain the immediate BTB successor of the branch when it follows the "taken" path and a list of BTB references that come after it, and another storage will be used to the immediate successor of the branch when it follows the "non-taken" path and the corresponding list of references. The first entry of each of the two lists will always be used by this direct transition. The rest of the entries will be used by the concatenation of the two lists of entries in B, for use in back-propagation.

To avoid an explosion of prefetches-per-access, references may only be added for accesses that hit in the last-level BTB and miss in earlier levels. This means later prefetches will be promotions from the last-level BTB to the previous level.

In the presence of a BTB victim cache, references can be to entries in the BTB victim cache. Additional data in an entry will be used to indicate that a reference is to the BTB victim cache. Note that the size and mapping of the BTB victim cache may be different, requiring more bits for the reference.

The discovery of an instruction that is reliably always executed following a branch, referred to as direct followers, may be revisited for subsequent accesses to the same BTBs, to make sure the references are updated to new patterns or sequences found by the branch prediction 110 as well as newly discovered branches. For instance, the first time BTB B is found to follow BTB A, it may happen that BTB reference lists of B have not yet been populated, but they will be populated later, when BTB entry B is processed. In an additional example, for non-biased conditional branches, execution of a branch instruction may result in following an alternate path, which will then be added to the corresponding list, with, for instance, the first pass by back propagation circuitry 210 populating the taken path and a subsequent pass populating the non-taken path.

In one example, for indirect branches, each subsequent access can lead to a different target, and the list of references for that branch will be grown with the new ones, avoiding repetitions, and until the list is full. As in other branch types, only BTB entries that hit exclusively in the last BTB level will be included. For loop branches, both the continuation and the loop exit references can be added to the list, note that this is a particular case of conditional branches, so taken and not-taken slots will be used. Note that followers, in one example, are not deleted, to avoid removing prefetches after they have been effective.

In a further example, indirect branches may be classified into two groups, easy and hard. Easy indirect branches, which may also be returns, always follow the same path, that is, their target PC never changes. Easy indirect branches can be trivially handled like unconditional branches, always and only filling followers for the "taken" path. Hard indirect branches can also be split in two subgroups, returns and non-returns. The distinction between the three groups can be encoded together with the branch type in the BTB entry that keeps information about them. This way, knowing the group encoding allows processing the different groups differently.

Handling easy indirect branches was described above. For hard branches, the list of successor BTB entries references may be kept together with the target. The target for hard returns is in the return stack buffer. The target for hard indirects is in the indirect predictor. One improvement is that, since each execution of a hard indirect may return a different target, it will also have its own list of successors. Entries in the return stack buffer and entries in the indirect predictor may be extended in a manner similar to that done for extending BTB entries, with the simplification that, since they are unconditional, there is only one list of successors for each branch.

Back propagation would work the same. If a current BTB points to a hard indirect branch, the indirect predictor will provide both the target and the list of successors, which will be concatenated in the previous BTB references, assuming the previous branch was an unconditional branch, for instance. Additionally, if the "previous branch", that is, the branch that lead from the previous BTB entry to the current BTB entry is a hard indirect, then the concatenation of current BTB followers will be done in the indirect predictor entry that lead to the current BTB entry Back propagation circuitry 210 will build chains of BTB references that include each other. For instance, if a typical sequence of BTB entries A=>B=>C=>D=>E is incrementally annotated, followers of E will be in followers of D, C, B, A and so on, until the list of references fills up due to register/storage size limitations for each BTB entry. In one example, the number of entries may vary between 2 and 8, but in further examples there may be no limits. Higher numbers may result in too much prefetching, which may impact system performance, however, the dynamic behavior of the prefetcher may prevent too much prefetching. This propagation effectively moves references earlier in the chain, making the prefetches happen earlier. Infinite propagation is prevented by the physical size limit of the lists. During a normal walk for BTB entries, these lists of followers are used to prefetch entries that might be used in the future. Traversal of these lists may be governed by two dynamically programmable parameters: distance and depth, described in further detail below.

To add flow control between prefetch, generation, and execution, a BTB miss queue 250 is used, which is a structure that holds information for BTB entries to be prefetched, like the level (last or victim cache) and the entry set and way. When a new BTB prefetch operation is created, it is inserted into the BTB miss queue 250. Each valid entry contains a reference to an entry in last-level BTB or a BTB Victim Cache, if present, and a bit to distinguish between both. A reference is composed of the concatenation of two parts: the encoded "set index" and the encoded "way index" of the entry to be prefetched, assuming the referenced entity organization is set-associative. When the BTB miss queue 250 becomes full, either the youngest or the oldest prefetch will be dropped, governed by a programmable flag.

Since the nature of back-propagation will list a BTB entry several times in a chain in some entries, a method is needed to avoid prefetching several times. The BTB miss queue 250 can be used so that new insertions are cancelled when the same references are already present, which can be verified by comparing the contents.

The branch prediction circuitry 110 will opportunistically pick entries from the BTB miss queue 250 and use the information to promote entries from last level BTB to previous level BTB, and then deallocating the BTB miss queue 250 entry. For this, the way and set indices in the BTB miss queue 250 entry will be used to read the last level BTB and start an allocation of that entry into the previous BTB level. Note that the previous BTB level may already have the same entry, in which case a promotion is unnecessary, or the allocation may require evicting a previous entry from that level, following the regular procedures for the structure. The entry being promoted may have changed (due to a replacement) since the time it was considered as a candidate for prefetching. This is an acceptable corner-case that will be fixed during the reconstruction of the references during new traversals of the sequence of branches, or dropped naturally by replacement policies of the BTB.

Both the distance and depth of prefetches can be fine-tuned by an algorithm dynamically. Distance refers to where in the list to start prefetching, while depth refers to the number prefetches to perform.

A shorter distance means the first follower to be prefetched happens earlier in the list. For instance, the shortest prefetch distance in the example above for BTB entry A would be achieved by starting prefetches at entry B, whereas a longer distance would be achieved by starting prefetches at entry D.

A shallower prefetching could be achieved by following only one reference from the list, whereas a deeper prefetching could be achieved by following all the references from the list.

The prefetching algorithm can be tuned with several parameters that may be set by a user or administrator, namely: minimum and maximum prefetch distance and minimum and maximum prefetch depth. If the values for minimum and maximum parameters are different, the algorithm will automatically move between both values based on several metrics obtained from the execution and four set-table thresholds.

When the number of non-prefetch BTB misses hitting prefetch BTB accesses that are currently being executed in the last N cycles surpasses a programmable threshold, the prefetch distance is increased by one. N can be dynamically configured using a control register.

When the number of BTB evictions in the last M cycles surpasses a programmable threshold, the prefetch distance is decreased by one. M can be dynamically configured using a control register.

When the number of inflight BTB prefetches goes below a programmable threshold, the prefetch depth is increased by one. This is determined by the occupancy of the miss queue 250.

When the number of inflight BTB prefetches goes above a programmable threshold, the prefetch depth is decreased by one. This is determined by the occupancy of the BTB miss queue 250.

Figure 3:
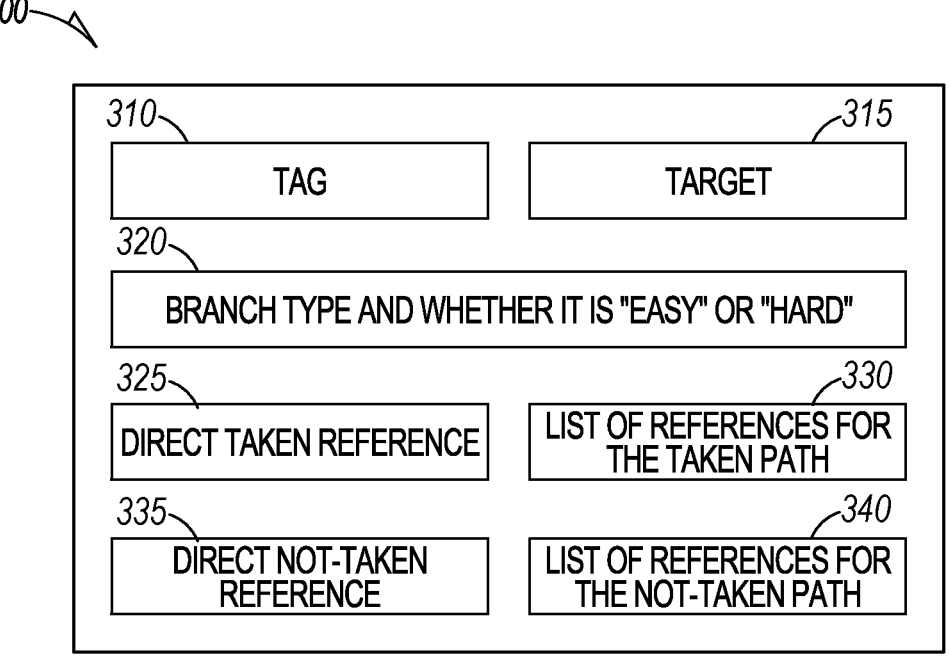
FIG. 3 is a diagram illustrating a BTB entry that has been extended to reflect one or more further BTB entries that have been taken, or alternatively, not taken, during instruction execution according to an example embodiment.

FIG. 3 is a diagram illustrating a BTB entry 300 that has been extended to reflect one or more further BTB entries that have been taken, or alternatively, not taken, during instruction execution. BTB entry 300 includes a tag 310 that may be a subset of bits from the program counter, to fully identify the value (referred to as A) in the program counter of the branch the BTB entry refers to. Entry 300 also includes a target program counter value 315 to fully identify the target of the branch. Entry 300 may optionally include information about the branch type 320 which may indicate whether the branch type is easy or hard.

Entry 300 has been extended to include a further entry 325 that indicates a direct taken reference, along with a list of references for the taken path 330. The list of references for the taken path 330 may reference to the branch instruction, B. As execution of instructions continues, further BTB entries C and E. may be added until an extended BTB entry storage limit is reached. BTB entry 300 may also include a direct not taken reference 335 along with a list of references for the not-taken path 340.

As described above, if entry B is encountered in a different sequence of instructions having a different BTB entry other than entry A, the followers of B, entries C-E, will be added as references to the different BTB entry, extending such entry.

Figure 4:
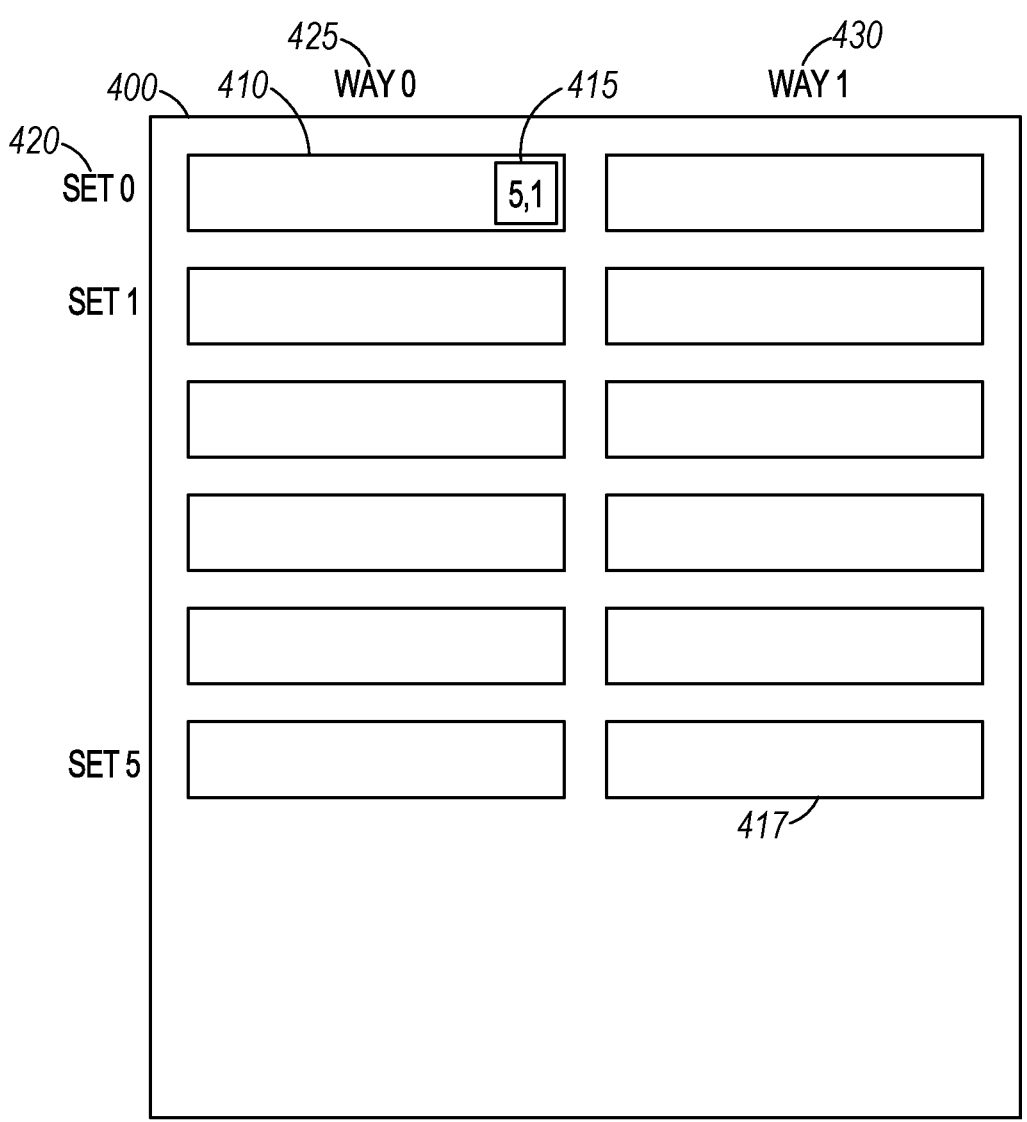
FIG. 4 shows an example of a last level BTB having a set-associative organization according to an example embodiment.

FIG. 4 shows an example of a last level BTB 400 having a set-associative organization. To extend a BTB entry 410, only references 415 to a last level BTB entry 417 located at set 5, way 1, are added. The last level BTB 400 will have a number of sets, such as set 0 at 420 and each set will have a number of ways, way 0 at 425 and way 1 at 430. One BTB entry occupies exactly one way from one set. Sets and ways may be through of as rows and columns of a table. So, to reference a particular entry in the BTB one need only specify two indices: the index to the set, or row, and the index to the column, or way. For description purposes, assume that the last level BTB has 1024 rows (sets) and 8 columns (ways). Each cell in the table of 1024×8 is one BTB entry. So, the index to the row or set is a number between 0 and 1023, and an index to the column or way is an index between 0 and 7. Since numbers are stored in binary encoding, log 2(1024) =10 and log 2(8)=3 bits are needed, respectively, to encode indices for rows and columns. So a reference to the BTB entry is made of two indices, the first one is 10 bits and the second one is 3 bits. This describes what one reference is. For example, "712, 3" would be a reference to row 712 and way 3. In a particular BTB entry there may be multiple references to other BTB entries. And we organize them the following way. One reference for direct taken path. One reference to direct non-taken path. A list of references that come after the direct taken path, and a list of references that come after the non-taken path.

Figure 5:
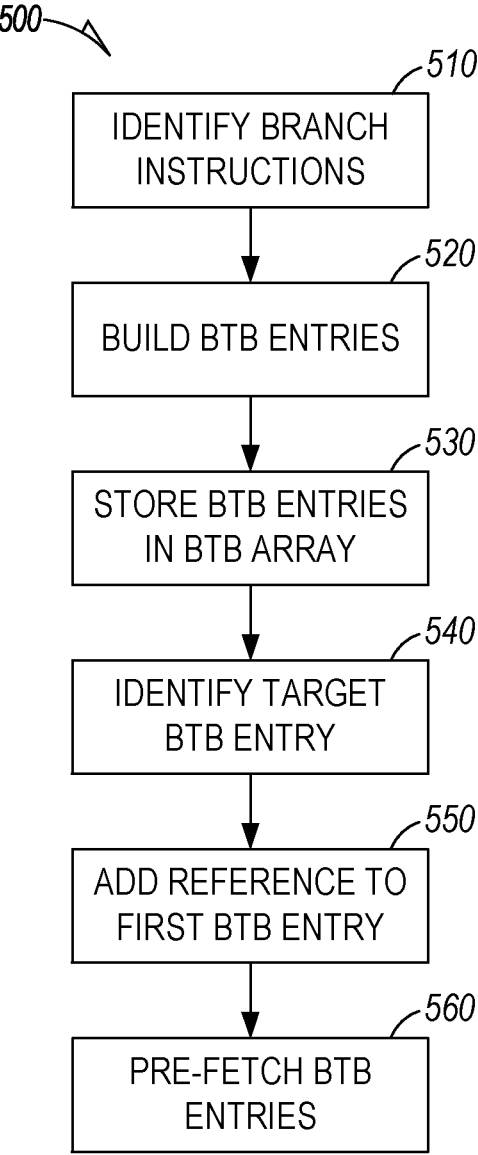
FIG. 5 is a flowchart illustrating a method of generating extended BTB branch prediction entries according to an example embodiment.

FIG. 5 is a flowchart illustrating a method 500 of generating extended BTB branch prediction entries according to an example embodiment. Method 500 begins at operation

510 by identifying processor branch instructions. Operation 520 builds branch target buffer (BTB) branch prediction entries corresponding to the branch instructions. The BTB branch prediction entries are stored at operation 530 in a hierarchy of BTBs. Operation 540 identifies a target branch instruction having a target BTB entry following execution of a first branch instruction having a first BTB branch prediction entry. A target BTB entry reference is added to the first BTB branch prediction entry at operation 550. Adding the target BTB entry reference to the first BTB branch prediction entry may include adding a set and way reference to the target BTB entry.

In one example the BTB branch prediction entry may be further extended with additional references to target BTB entries as further targets of branch instructions are identified in a sequence of instructions to create a list of references. Separate lists of BTB branch prediction entry references may be maintained, corresponding to branches taken and branches not taken.

Each BTB branch prediction entry may include a tag to identify a program counter value of a current instruction, such as the first branch instruction, and a target program counter value.

A BTB miss queue that holds an index to BTB branch prediction entries to be prefetched may also be maintained. A BTB branch prediction entry may be extended with additional references to target BTB entries as further targets of branch instructions are identified in a sequence of instructions to create a list of references.

Method 500 may further include prefetching branch prediction entries at operation 560 as a function of a distance parameter specifying how far into the list to begin prefetching.

Prefetching branch prediction entries may be performed as a function of a depth parameter specifying how many branch prediction entries to prefetch following application of the distance parameter. Prefetching branch prediction entries may include promoting the prefetched branch prediction entries to a faster access level of BTB buffer.

Modifying the distance parameter may be performed in response to BTB prefetch misses and BTB branch prediction entry evictions from the BTB buffer passing respective thresholds.

Modifying the depth parameter may be performed in response to a number of inflight BTB prefetches being above or below respective high and low thresholds.

Figure 6:
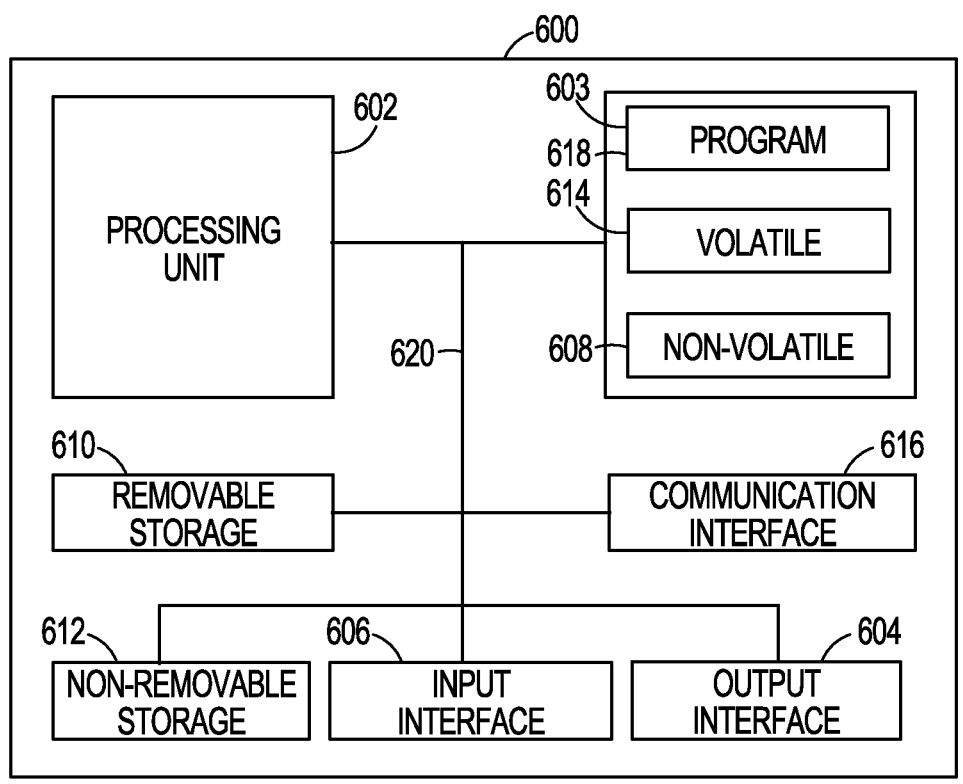
FIG. 6 is a block schematic diagram of a computer system to implement one or more example embodiments.

FIG. 6 is a block schematic diagram of a computer system 600 to create and extend branch prediction entries, pre-fetch instructions, and branch prediction entries, and for performing methods and algorithms according to example embodiments. All components need not be used in various embodiments. Many of the branch prediction functions may utilize circuitry that operates at higher speeds than a central processing unit.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 618 along with the workspace manager 622 may be used to cause processing unit 602 to perform one or more methods or algorithms described herein.

EXAMPLES

1. A method includes identifying processor branch instructions, building branch target buffer (BTB) branch prediction entries corresponding to the branch instructions, storing the BTB branch prediction entries in a hierarchy of BTBs, identifying a target branch instruction having a target BTB entry following execution of a first branch instruction having a first BTB branch prediction entry, and adding a target BTB entry reference to the first BTB branch prediction entry.

2. The method of example 1 wherein adding the target BTB entry reference to the first BTB branch prediction entry comprises adding a set and way reference to the target BTB entry.

3. The method of any of examples 1-2 wherein the first BTB branch prediction entry includes a tag to identify a program counter value of a current instruction and a target program counter value.

4. The method of any of examples 1-3 and further comprising maintaining separate lists of BTB branch prediction entries corresponding to branches taken and branches not taken.

5. The method of any of examples 1-4 and further comprising maintaining a BTB miss queue that holds an index to BTB branch prediction entries to be prefetched.

6. The method of any of examples 1-5 wherein adding the target BTB entry reference to the first BTB branch prediction entry comprises extending the BTB branch prediction entry with additional references to target BTB entries as further targets of branch instructions are identified in a sequence of instructions to create a list of references.

7. The method of example 6 and further comprising prefetching branch prediction entries as a function of a distance parameter specifying how far into the list to begin prefetching.

8. The method of example 7 and further comprising prefetching branch prediction entries as a function of a depth parameter specifying how many branch prediction entries to prefetch following application of the distance parameter.

9. The method of example 8 wherein prefetching branch prediction entries comprises promoting the prefetched branch prediction entries to a faster access level of BTB buffer.

10. The method of example 9 and further comprising modifying the distance parameter in response to BTB prefetch misses and BTB branch prediction entry evictions from the BTB buffer passing respective thresholds.

11. The method of any of examples 9-10 and further comprising modifying the depth parameter in response to a number of inflight BTB prefetches being above or below respective high and low thresholds.

12. A device includes a branch history register identifying processor branch instructions, a branch target buffer (BTB) containing branch prediction entries corresponding to the branch instructions, and a back propagation circuit coupled to the branch history register and the BTB configured to identify a target branch instruction having a target BTB entry following execution of a first branch instruction having a first BTB branch prediction entry and add a target BTB entry reference to the first BTB branch prediction entry.

13. The device of example 12 wherein the back propagation circuitry is further configured to maintain separate lists of BTB branch prediction entries corresponding to branches taken and branches not taken.

14. The device of any of examples 12-13 and further comprising a BTB miss queue configured to hold an index to BTB branch prediction entries to be prefetched.

15. The device of any of examples 12-14 wherein the BTB branch prediction entry is extended via the back propagation circuit with additional references to target BTB entries as further targets of branch instructions are identified in a sequence of instructions to create a list of references.

16. The device of example 15 and further comprising branch prediction circuitry configured to prefetch branch prediction entries as a function of a distance parameter specifying how far into the list to begin prefetching and as a function of a depth parameter specifying how many branch prediction entries to prefetch following application of the distance parameter.

17. The device of example 16 wherein the branch prediction circuitry is further configured to prefetch branch prediction entries by modifying the distance parameter in response to BTB prefetch misses and BTB branch prediction entry evictions from the BTB buffer passing respective thresholds and modifying the depth parameter in response to a number of inflight BTB prefetches being above or below respective high and low thresholds.

18. A branch prediction system having circuitry and memory is configured to perform a method including identifying processor branch instructions, building branch target buffer (BTB) branch prediction entries corresponding to the branch instructions, storing the BTB branch prediction entries in a hierarchy of BTBs, identifying a target branch instruction having a target BTB entry following execution of a first branch instruction having a first BTB branch prediction entry, and adding a target BTB entry reference to the first BTB branch prediction entry.

19. The system of example 18 and further including maintaining separate lists of BTB branch prediction entries corresponding to branches taken and branches not taken and maintaining a BTB miss queue configured to hold an index to BTB branch prediction entries to be prefetched.

20. The system of any of examples 18-19 and further including extending the BTB branch prediction entry with additional references to target BTB entries as further targets of branch instructions are identified in a sequence of instructions to create a list of references and prefetching branch prediction entries as a function of a distance parameter specifying how far into the list to begin prefetching and as a function of a depth parameter specifying how many branch prediction entries to prefetch following application of the distance parameter.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
identifying processor branch instructions;
building branch target buffer (BTB) branch prediction entries corresponding to the branch instructions;
storing the BTB branch prediction entries in a hierarchy of BTBs;
identifying a target branch instruction having a target BTB entry following execution of a first branch instruction having a first BTB branch prediction entry; and
adding a reference to the target BTB entry to the first BTB branch prediction entry.

2. The method of claim 1 wherein adding the reference to the target BTB entry to the first BTB branch prediction entry comprises adding a set and way reference to the target BTB entry.

3. The method of claim 1 wherein the first BTB branch prediction entry includes a tag to identify a program counter value of a current instruction and a target program counter value.

4. The method of claim 1 and further comprising maintaining separate lists of BTB branch prediction entries corresponding to branches taken and branches not taken.

5. The method of claim 1 and further comprising maintaining a BTB miss queue that holds an index to BTB branch prediction entries to be prefetched.

6. The method of claim 1 wherein adding the reference to the target BTB entry to the first BTB branch prediction entry comprises extending the BTB branch prediction entry with additional references to target BTB entries as further targets of branch instructions are identified in a sequence of instructions to create a list of references.

7. The method of claim 6 and further comprising prefetching branch prediction entries as a function of a distance parameter specifying how far into the list to begin prefetching.

8. The method of claim 7 and further comprising prefetching branch prediction entries as a function of a depth parameter specifying how many branch prediction entries to prefetch following application of the distance parameter.

9. The method of claim 8 wherein prefetching branch prediction entries comprises promoting the prefetched branch prediction entries to a faster access level of BTB buffer.

10. The method of claim 9 and further comprising modifying the distance parameter in response to BTB prefetch misses and BTB branch prediction entry evictions from the BTB buffer passing respective thresholds.

11. The method of claim 9 and further comprising modifying the depth parameter in response to a number of inflight BTB prefetches being above or below respective high and low thresholds.

12. A device comprising:
a branch history register identifying processor branch instructions;
a branch target buffer (BTB) containing branch prediction entries corresponding to the branch instructions; and
a back propagation circuit coupled to the branch history register and the BTB configured to:
identify a target branch instruction having a target BTB entry following execution of a first branch instruction having a first BTB branch prediction entry; and
add a reference to the target BTB entry to the first BTB branch prediction entry.

13. The device of claim 12 wherein the back propagation circuitry is further configured to maintain separate lists of BTB branch prediction entries corresponding to branches taken and branches not taken.

14. The device of claim 12 and further comprising a BTB miss queue configured to hold an index to BTB branch prediction entries to be prefetched.

15. The device of claim 12 wherein the BTB branch prediction entry is extended via the back propagation circuit with additional references to target BTB entries as further targets of branch instructions are identified in a sequence of instructions to create a list of references.

16. The device of claim 15 and further comprising branch prediction circuitry configured to prefetch branch prediction entries as a function of a distance parameter specifying how far into the list to begin prefetching and as a function of a depth parameter specifying how many branch prediction entries to prefetch following application of the distance parameter.

17. The device of claim 16 wherein the branch prediction circuitry is further configured to prefetch branch prediction entries by modifying the distance parameter in response to BTB prefetch misses and BTB branch prediction entry evictions from the BTB buffer passing respective thresholds and modifying the depth parameter in response to a number of inflight BTB prefetches being above or below respective high and low thresholds.

18. A branch prediction system having circuitry and memory configured to perform a method comprising:

identifying processor branch instructions;

building branch target buffer (BTB) branch prediction entries corresponding to the branch instructions;

storing the BTB branch prediction entries in a hierarchy of BTBs;

identifying a target branch instruction having a target BTB entry following execution of a first branch instruction having a first BTB branch prediction entry; and adding a reference to the target BTB entry to the first BTB branch prediction entry.

19. The system of claim 18 and further comprising:

maintaining separate lists of BTB branch prediction entries corresponding to branches taken and branches not taken; and maintaining a BTB miss queue configured to hold an index to BTB branch prediction entries to be prefetched.

20. The system of claim 18 and further comprising:

extending the BTB branch prediction entry with additional references to target BTB entries as further targets of branch instructions are identified in a sequence of instructions to create a list of references; and prefetching branch prediction entries as a function of a distance parameter specifying how far into the list to begin prefetching and as a function of a depth parameter specifying how many branch prediction entries to prefetch following application of the distance parameter.

\* \* \* \* \*